United States Patent Office 3,551,460
Patented Dec. 29, 1970

3,551,460
PROCESS FOR SULPHONATION
Austen E. Sowerby, Cumberland, England, assignor to Electric Reduction Company of Canada Ltd., Toronto, Ontario, Canada, a company of Canada
Filed Feb. 26, 1968, Ser. No. 708,191
Claims priority, application Great Britain, Mar. 1, 1967, 9,735/67; July 12, 1967, 32,084/67; Oct. 30, 1967, 49,246/67
Int. Cl. C07c *143/90;* C11d *1/28*
U.S. Cl. 260—401                    13 Claims

ABSTRACT OF THE DISCLOSURE

A process for suphating and sulphonating organic compounds by means of free sulphur trioxide wherein the product of the reaction of $SO_3$ with the organic compound is subsequently reacted with an amino compound to form a further compound, the reaction between $SO_3$ and the organic compound taking place in the presence of at least some of the further compound. Suitable amino compounds for the purpose include aliphatic aromatic and heterocyclic amines, complexes of amines, salts of amines and ammonia.

---

Figure 1:
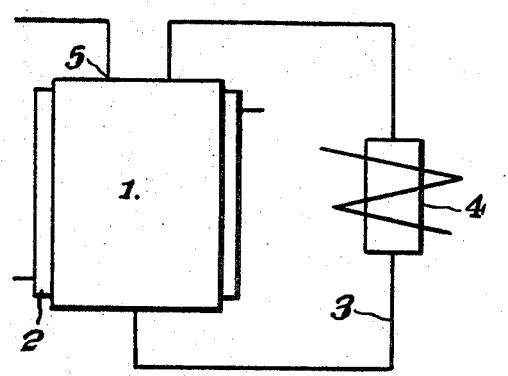

The present invention relates to a new method for using sulphur trioxide in the sulphonation of organic compounds. When used herein the term "sulphonation" is to be taken as having a broad generic meaning so as to refer to the insertion of —$SO_3H$ substituents into an organic molecule such that they are linked to the rest of the molecule either through a direct carbon-sulfur linkage or through a carbon-oxygen-sulphur linkage, and a sulphonated organic compound is to be taken as one having an —$SO_3H$ group bound to the rest of the molecule either through a direct carbon-sulphur linkage or through a carbon-oxygen-sulphur linkage.

Many of the sulphonation products of the compounds treated in the process of the invention are widely used in detergent compositions. However, if high yields of the products are to be obtained in sulphonation processes using sulphur trioxide, it has hitherto been necessary to use rather complex methods because of the difficulty of obtaining 100% conversion of the organic material. There have in recent years been several proposals for improving the yields of sulphonation reactions using sulphur trioxide which have involved the design of special and elaborate reaction vessels and typical of these is the one for sulphonating fatty alcohols and alkaryl hydrocarbons described in Patent No. 3,199,960.

It is an object of the invention to provide a process of sulphonation using sulphur trioxide as the sulphonating agent, which can be carried out in simple and conventional reaction vessels although more complex systems may be used if desired. This object has now been achieved by adding to the product of the sulphonation reaction an amino-compound capable of forming a further product with the sulphonated organic compound which product is preferably a liquid or is soluble under the conditions of the reaction. This addition can be carried out either in the sulphonation reaction vessel or in a separate reactor with re-cycling of the further product into the sulphonation reaction mixture.

Accordingly from one aspect the present invention provides a process for the production of sulphonated organic compounds, as hereinbefore defined, which process comprises: (1) adding free sulphur trioxide to a sulphonatable organic compound liquid under the conditions of the reaction; and (2) reacting at least some of the product from stage (1) with an amino compound capable of forming a further product therewith, this reaction being carried out in a manner such that at least part of the process of stage (1) is carried out in the presence of some of this further product. Preferably, the product from stage (2) is subsequently reacted with a stronger base than the amino compound used in stage (2) in order to obtain a salt of the sulphonated organic compound, the amino-compound being thus liberated for re-use.

Compounds which may be sulphonated by the process of the invention include: primary and secondary saturated and unsaturated, alcohols, in particular those having from 8 to 26 carbon atoms such as for example, octanol, lauryl alcohol, stearyl alcohol the mixtures of alcohol known as coconut alcohols and tallow alcohols, oleyl and cetyl alcohols, olefines, in particular those having from 8 to 20 carbon atoms such as for example deca-1-ene, dodeca-1-ene tetradeca - 1 - ene and hexadeca-1-ene and various internally unsaturated olefines such as dodeca-2-ene, tetradeca-4-ene and their mixtures, ketones, both saturated and unsaturated, in particular those having from 8 to 20 carbon atoms; saturated and unsaturated fatty acids especially those having from 8 to 20 carbon atoms such as for example lauric and stearic acids and those sold under the trade name Versatic acids; and alkanolamides of fatty acids. As alcohols there may also be mentioned condensates of alkylene oxides, particularly ethylene and/or propylene oxides, with alkylphenols or saturated or unsaturated alcohols having from 8 to 26 carbon atoms for example those having from 3–6 alkylene oxide groups such as nonyl phenol condensed with 4 moles of ethylene oxide, lauryl phenol condensed with 3 moles of ethylene oxide or hexa-decaphenol condensed with 5 moles of propylene oxide.

The organic material to be sulphonated will either be itself liquid under the conditions of the reaction, or may be so rendered by introducing it to the reaction vessel in the form of a solution in a solvent which is not itself sulphonated under the conditions of the reaction. A low boiling solvent is preferably used to simplify its removal from the sulphonated product and suitable solvents are paraffin hydrocarbons, particularly the low boiling paraffins (sometimes termed petroleum ethers), such as butane and pentane. When the material to be sulphonated is fed into the reactor in the form of a solution, the solvent may be stripped from the sulphonated product after this has been removed from the reaciton vessel. If a low boiling solvent is used, as is highly preferred, this may be stripped by distillation, which for convenience may be carried out under reduced pressure. However, if a high boiling solvent is used this may be extracted by means of solvent extraction techniques and if there is a neutralisation stage required in order to obtain the desired product, the solvent extraction stage may conveniently be carried out after such neutralisation.

The process of the invention is particularly suitable for obtaining a good overall yield of alkyl sulphates from the reactions of secondary alcohols with sulphur trioxide. It has now been found that when the process is used for the sulphonation of olefins, or unsaturated alcohols, the proportion of undesired products resulting from poly-sulphonation reactions is diminished and that, when used for sulphonating alkyl phenol/alkylene oxide condensates, it promotes sulphonation at the hydroxyl group rather than substitution of the aromatic nucleus.

It is highly preferred that the amino-compounds for use in the process of the present invention will form the liquid product with the sulphonated organic product or will form a product that is soluble in the reaction mixture. It is also preferred that the amino compounds used have one or more of the hereinafter stated properties. Firstly, a complex with sulphur trioxide stable under the reaction conditions should not be formed since, should this occur, it may be necessary to introduce a maturing step to enable the complex to break down and so allow the sulphonation to be carried out with the free sulphur trioxide. Secondly, if the desired final product is not a salt of the amino compound employed the amino-compound added should be reasonably volatile so that it can be easily distilled from the reaction mixture without having to use elaborate techniques, such as counter current extraction to separate it after extraction of the product from stage (2) of the process to a salt of the sulphonated compound with a stronger base. Thirdly, the addition of the amino-compound should not cause such a rise in the viscosity of the sulphonation reaction mixture as to make the agitation of the reaction mixture difficult. Hence the choice of amino-compound to be used will often be dependent upon the compound being sulphonated. Thus, for example, whilst ammonia is generally not preferred, as a result of the insolubility of ammonium salts, it may be used if the compound to be sulphonated is one giving a soluble ammonium salt of its sulphonate, for instance glycol ethers such as a saturated primary alcohol condensed with from 1 to 3 moles of ethylene oxide.

The compounds which are of particular use as amino-compounds in the process of the invention are primary, secondary and tertiary aliphatic amines, heterocyclic amines, such as pyridine or morpholine, or ammonia itself. There may also be used amine complexes and salts of amines with weak acids. Preferred compounds are the low boiling aliphatic amines having 1 to 3 carbon atoms in each alkyl group, such as methylamine, ethylamine, isopropylamine, dimethylamine, diethylamine, di-isopropylamine, trimethylamine and triethylamine. The amines may contain inert substituents, but hydroxylic and carboxylic substituents are usually to be avoided because of their low volatility and because of the reactivity of such substituents towards sulphur trioxide. Among aromatic amines of use in the process are aniline and substituted anilines such as monomethyl and dimethyl aniline.

Amine complexes which are of particular use in the process of the invention are those where the complex formed by the amine and the complexing agent is less stable than the complex formed by sulphur trioxide.

We have found, in particular, that the complex of an amine, especially of a trialkylamine, with sulphur dioxide is of use in the process of the invention. The use of such a complex is particularly advantageous if the sulphur trioxide used as the sulphonating agent is in the form of a solution in sulphur dioxide or as a gas diluted with sulphur dioxide, since under these conditions the sulphur dioxide in the complex may be easily recycled after the complex has broken down.

Amine salts of particular use in the process of the invention are those of acids which do not themselves react with sulphur trioxide, especially those of sulphonic acids as may be formed by the process of the invention. The amine salts may be introduced to the reaction vessel in any convenient fashion, for example in a batch sulphonation process they may be present in the reactor as a heel before the sulphonation is commenced or they may be introduced to the reactor during sulphonation. It may be convenient to form such an amine salt in situ in the reaction mixture by mixing into the material which is to be sulphonated a compound which is itself readily sulphonatable, such as an alkylbenzene, so that this is preferentially sulphonated in a co-sulphonation reaction and so forms its amine salt on the introduction of an amine; thus this amine sulphonate salt acts as the amino compound in the process of sulphonating the less readily sulphonatable material. It is preferred that the amine whose salts are used are volatile so that if desired the amine may be separated from the product by distillation. If, when using an amine sulphonate salt, it is desired to separate the sulphonated products, this may be done by fractional crystallisation but normally the compounds and their relative proportions will be chosen so that the mixture obtained may itself be used as a detergent raw material.

The amount of amino-compound to be added in order to obtain the optimum effect by using the process of the invention depends upon the conditions which are desired for the sulphonation which in turn is often dependent upon the nature of the compound being sulphonated. The reaction conditions may be modified according to the nature of the organic material being reacted with sulphur trioxide by increasing or reducing the proportion of amino-compound present. The most severe reaction conditions are obtained when only a small amount of amino-compound, say 10% of that required to react with the amount of sulphonated organic compound present, is added. Conversely, the reaction conditions which exist when the amount of amino-compound added is sufficient to react with from 40 to 100% of the sulphonated organic compound present are particularly mild and suitable for the sulphonation of secondary alcohols and unsaturated alcohols as well as the sulphonation of olefines. In any particular instance the optimum amount of amino-compound may readily be found by a few simple experiments.

If desired, however the amount of amino-compound added may be sufficient to react completely with the sulphonated organic compound present and with any excess sulphur trioxide employed in, or sulphuric acid produced by, the reaction. By this means a completely neutral reaction product is obtained which is mostly the amine salt of the sulphonated organic compound. When some smaller amount of amino-compound is added there is then obtained a mixture of the free sulphonated organic compound and its salt with the amino-compound.

To obtain an amine salt of the sulphonated product, that amine may be used as the said amino-compound in the process of the invention and the product for stage (2) then completely neutralised, if necessary, with a further amount of the amine.

The sulphur trioxide to be used as the sulphonating agent in the process of the invention will normally be used in the form of a pure gas or mixed with an inert gas diluent, such as dry air, nitrogen, sulphur dioxide or carbon dioxide, the proportion of sulphur trioxide in this gas mixture usually being from 1–20%, preferably in the range 2–8% by volume, frequently it is about 5% by volume. The sulphur trioxide can, if desired, be fed in as a gas without any diluent, but it is then much preferred that the reaction mixture is kept under a subatmospheric pressure, for example less than 4 p.s.i., preferably in the range 0.3 to 2.0 p.s.i. A further form in which the sulphur trioxide may be added is as a solution in an inert solvent, such as liquid sulphur dioxide, methylene chloride, carbon tetrachloride, butane, pentane or a member of the Freon group, in such a case the sulphur trioxide is usually present in the solution to the extent of from 1–20%, preferably from 2–10%, by weight. The sulphur trioxide can also be used in the form of a pure liquid, the other reactant and the product acting as a diluent. The total amount of sulphur trioxide to be added, is preferably substantially the amount required to achieve the desired degree of sulphonation of the sulphonatable organic compound. This will generally be a slight stoichiometric excess of sulphur trioxide over the organic compounds to be sulphonated, for example up to a 30% molar excess of sulphur trioxide.

If gaseous sulphur trioxide is used in an inert gas diluent this can be introduced at pressures of from 0.03 to 1.3 atmospheres at a temperature in the range of about 10 to 110° C., preferably in the region of 40° C., although other temperatures and pressures may be used should this be found desirable in a particular case. If sulphur trioxide is dissolved in liquid sulphur dioxide, it is preferred to effect this introduction under pressure, in order to maintain the sulphur dioxide in the liquid state, although in some cases it may be possible to maintain this liquid state by cooling if the sulphonatable compound has a sufficiently low melting point. In any case if the sulphur trioxide is introduced at the bottom of the reaction vessel, as is often the case, it will be necessary for it to be under sufficient pressure to overcome the hydrostatic pressure due to the reaction mixture in the vessel.

The temperature of the reaction vessel during the sulphonation stage will be such as to keep the compound to be sulphonated as a liquid. Normally it is preferred to keep the temperature within a few degrees of the lowest temperature at which this is possible and for this purpose it is often convenient to fit the reaction vessels used with cooling jackets and/or an internal cooling system.

If the sulphur trioxide is added to the organic material in a gaseous form it is often desirable to degas the product after extraction from the sulphonation reaction system. This may be carried out in any conventional manner but it has been found convenient to use a centrifugal separation. If the sulphur trioxide or the organic material is added dissolved in a solvent it is convenient to remove the solvent by distillation.

Obviously the process of the invention may be carried out in a number of ways. There can be used either a continuous or a batch process, although for commercial reasons the former will normally be preferred, and both of these can be carried out in either a single or a multistage reaction vessel. If a single vessel is used in a batch process it is preferred not to start adding the amino-compound until after some of the organic compound has been sulphonated, although it is also possible if the amino compound used is an amine complex or salt, to premix the amino-compound with the sulphonatable compound and then pass in sulphur trioxide.

A process of this type may be described with reference to FIG. 1 of the accompanying drawings. The apparatus used consists of a reaction vessel 1, having a cooling jacket 2, and a recycle loop 3, passing through a condenser 4. In operation cooling water is passed through a cooling jacket 2, and the condenser 4. Sulphur trioxide in whatever form is desired is fed into the reactor 1, through the inlet 5, wherein there is already present the compound to be sulphonated. Some of the product of this reaction is taken off by the recycle loop 3, and the amino-compound is introduced to it. The resultant mixture containing the further product for the aforesaid stage (2) is then passed through the condenser 4, and returned to the reaction vessel 1.

Figure 2:
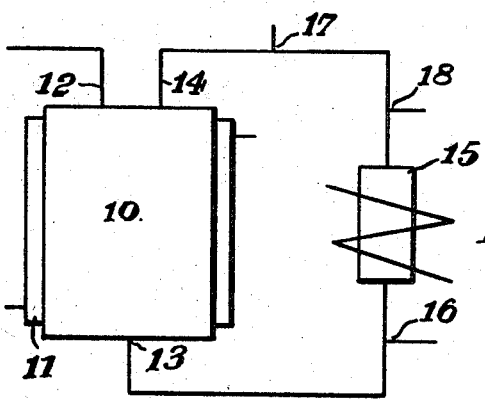

In the case of a reaction vessel operated on a continuous basis it is preferred to add the amino-compound at a point down-stream from the point of introducing the sulphur trioxide and the sulphonatable compound. A simple reaction vessel which can be used for operating on a continuous basis is described with reference to FIG. 2 of the accompanying drawings. The reaction system consists of a reaction vessel 10 fitted with a cooling jacket 11, an inlet pipe 12, an exit to a recycle loop 13, and an inlet rom the recycle loop 14, the recycle loop passes through a condenser 15, and has fitted to it two inlets 16 and 17, and an outlet 18. In operation cooling water is passed through the cooling jacket 11 and the condenser 15. Sulphur trioxide is fed into the reaction vessel 10 by means of the inlet 12 and the organic compound to be sulphonated is fed into the recycle loop through the inlet 17 and thence through the inlet 14 to the reaction vessel 10. The product from the reaction vessel is taken through the outlet 13 to the recycle loop and to it is introduced the amino-compound through the inlet 16; the product obtained from the partly sulphonated compound withdrawn into the recycle loop and the introduced amine is then passed through the condenser 15. Some of the product will be taken off by the outlet 18 and the remainder will pass back to the reaction vessel 10 via the inlet 14, more organic compound having been introduce through the inlet 17 on the way.

Figure 3:
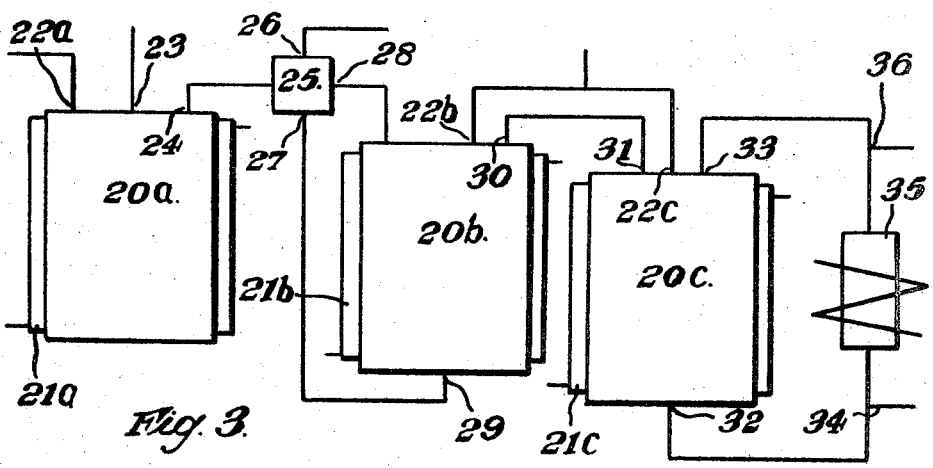

In order to obtain a more efficient utilisation of the sulphur trioxide used it may be desirable to use a multistage process. In simple multistage processes where the organic compound is caused to flow through a succession of vessels it is reacted in each with sulphur trioxide and the amino-compound may conveniently be introduced to the partly sulphonated product as it flows from one vessel to the next. A reaction system of this type may be described with reference to FIG. 3 of the accompanying drawings. The system consists of three reaction vessels 20a, 20b, 20c each fitted with a cooling jacket 21a 21b, 21c and an inlet 22a, 22b, 22c. In addition the first reactor 20a is fitted with a second inlet 23 and an outlet 24 leading to a mixer 25 which is fitted with an inlet 26, and an inlet 27 connected to the bottom of the second reaction vessel 20b, and an outlet 28, leading to the top of the second reaction vessel 20b. The second reaction vessel is fitted, in addition to the inlet 22b, with an outlet 29, which leads to the mixer 25 via the inlet 27, and an outlet 30 leading to the third reaction vessel 20c via the inlet 31. The third reaction vessel is fitted, in addition to the inlet 22c, with an outlet 32 leading to a recycle loop which returns to the third reactor via the inlet 33. The recycle loop passes through a condenser 35 and is fitted with an inlet 34 and an outlet 36. In operation cooling water is passed through the cooling jackets 21a, 21b, 21c and the condenser 35; sulphur trioxide is introduced to each of the reactors, 20a, 20b, 20c through the inlets 22a, 22b, 22c, the compound to be sulphonated is introduced to the first reactor through the inlet 23 and the product of this reaction passes to the mixer via the outlet 24, the desired amino compound is introduced to the mixer via the inlet 26 and the product from this step passed into the second reactor 20b via the outlet 28. Part of the product from the second reactor 20b, is passed via the outlet 30 to the inlet 31 in the third reactor 20c and part is recycled via the outlet 29 to the inlet 27 of the mixer 25. The product from the third reactor is taken via the outlet 32 to the recycle loop and to it is introduced more amino-compound via the inlet 34 the product is then passed through the condenser 35 and some of the product (which is arranged to be virtually pure amine salt of the sulphonated compound) taken off through the outlet 36, the remainder being returned to the third reaction vessel, 20c via the inlet 33.

Although as previously stated it is intended to provide means of carrying out reactions in simple and conventional vessels the process of the invention is equally adaptable to more complex systems. It may for example be employed to advantage in multistage systems such as these described in Pat. No. 3,199,960 where sulphur trioxide is added in increments along the reaction path. In processes of this type according to the present invention, however, sulphur trioxide is added to alternate reaction zones only and into the remaining zones there is introduced sufficient amino-compound to react with all, or a proportion of, the sulphonated product that has so far been formed.

It may be wished to terminate the process at this point and to use the amine salt so obtained or a mixture of the amine salt with the free sulphonated compound and if this is so the desired product can be extracted at this point. If desired, the free sulphonic acid derivative can be obtained at this stage or, as is usually preferred, the amino salt may be converted into the salt of some other base, such as the salt of an alkali metal or an alkanolamine. The product at this stage will be a mixture of the free sulphonated compound and its salt with the amino-compound used. In many cases the process will have been carried out in such manner that the product of this stage is almost completely neutralised by the amino-compound. In order to convert this product to the desired salt, the free sulphonic acid must be neutralised and the amino salt caused to undergo cation exchange. In order to effect the latter the base chosen must be one that has a greater basic strength than the amino-compound used. It is frequently desired to obtain the alkali metal salt of the sulphonated compound and this can most conveniently be obtained by the addition of a solution of the desired alkali, say caustic soda, of a strength of from 25% to 60% by weight, preferably from 35% to 45% by weight, the amount of alkali added being sufficient to react with all the sulphonated product.

The method for recovering the liberated amino-compound will depend upon its nature and boiling point. If, as is much preferred, it is an amine of low boiling point, it can be recovered by simple distillation whereas if a high boiling point amine or other high boiling amino-compound has been used there will usually need to be employed such techniques as counter-current or some other form of solvent extraction.

The neutralised sulphonated product is then sold either in concentrated solution, optionally mixed with other surface active agents or other additives, or it is sold in flake form normally after having been drum dried or in the form of a powder after having been spray dried, the drying having been carried out either on the salt of the sulphonated product by itself or on it as a component of a mixture suitable for use as a detergent optionally mixed with other adjuvants. However, in the case where all of the sulphonated compound is converted to its amino salt it may be desired to sell this amino salt in some desired form without having carried out any further neutralisation or cation exchange stage.

The process of the invention is illustrated by the following examples:

EXAMPLES 1 TO 6

In Examples 1 to 6 the apparatus used was similar to that described above with reference to FIG. 1 but was modified by the incorporation of a sampling point in the re-cycle loop downstream of the heat exchanger 4. The reaction vessel 1 was fitted with an exhaust gas vent and an agitator, the inlet 5 was in the form of a sparge pipe and this was connected to a sulphur trioxide generator which supplied a mixture of sulphur trioxide and dry air containing 5% by volume of sulphur trioxide.

In Examples 1 to 6 the reaction vessel was charged with sulphonatable raw material, the nature of which is shown in Table 1 and the agitator started. The recycle pump was switched on so that the material in the reaction vessel circulated through the heat exchanger in the recycle loop and returned to the reaction vessel. The reaction mixture was kept at the desired temperature by passing water through the cooling jacket. A stream of sulphur trioxide from the generating apparatus was fed into the reaction vessel through the sparge pipe, the period of addition of $SO_3$ and the amount employed relative to the sulphonatable material is shown in Table I. Five minutes after the addition of sulphur trioxide was commenced a metered stream of amino-compound was continuously introduced by means of a proportionating pump to the entry point in the recycle loop. The rate of addition of the amino-compound was so regulated that the pH of a 1% aqueous solution of the reaction product withdrawn from the recycle loop downstream from the point of addition of the amine was in the range 5.0–6.0. The nature of the amino compound and the period for which it was added in each case are shown in Table I.

TABLE I

| Number of example or experiment | Organic material employed | Time of addition of $SO_3$, mins. | Overall molar ratio of $SO_3$: organic material | Amino compound employed | Time of addition of amino compound, mins. | Reaction temperature, °C. | Nature of product |
|---|---|---|---|---|---|---|---|
| Example 1 | Commercial $C_{13}$–$C_{17}$ secondary alcohols having M.W. of 221. | 95 | 1.1:1.0 | Triethylamine | 95 | 35 | 94% triethylamine salt of sulphonated $C_{13}$–$C_{17}$ secondary alcohols; 4.65% triethylamine salt of $H_2SO_4$. |
| Example 2 | do | 98 | 1.1:1.0 | Isopropylamine | 98 | 40 | 90% isopropylamine salt of sulphonated $C_{13}$–$C_{17}$ secondary alcohols; 6.41% isopropylamine salt of $H_2SO_4$. |
| Example 3 | Commercial oleyl alcohol. | 95 | 1.2:1.0 | Triethylamine | 98 | 30 | 92.6% sulphonated having 20% of double bond sulphated. |
| Example 4 | do | 87 | 1.2:1.0 | Monoisopropyl amine | 90 | 35 | 91.3% sulphonated having 73% retention of double bond. |
| Comparative Experiment 1. | do | 90 | 1.2:1.0 | | | 35 | 85.3% sulphonated having 57.6% sulphonation of double bond. |
| Example 5 | Nonyl phenol condensed with 4 moles of ethylene oxide. | 70 | 1.3:1.0 | Triethylamine | 72 | 50–55 | 96.7% sulphonated having a ring sulphonation of 6.15% on 100% active basis. |
| Comparative Experiment 2. | do | | 1.3:1.0 | | | 50 | 91.3% sulphonated having a ring sulphonation of 14% on 100% active basis. |
| Example 6 | Commercial $C_{13}$–$C_{17}$ secondary alcohols having M.W. of 221. | 105 | 1.1:1.0 | Equimolar complex of triethylamine and $SO_2$. | 105 | 35 | After neutralisation with a little triethylamine: 96.8% yield of triethylamine salt of secondary alcohol sulphate. |

EXAMPLE 7

In the first stage of a two-stage batch sulphation process, $C_{14}$–$C_{15}$ secondary alcohols were sulphated at a reaction temperature of 30° C. with 55% of the stoichiometric proportion of $SO_3$ in the form of a 5 vol. percent mixture with dry air. The partially sulphated reaction product was neutralised by the addition of the requisite amount of triethylamine and the sulphation was then completed by the addition of a further 0.65 gm. moles of $SO_3$ per gm. mole of alcohol. The reaction product was neutralised by the addition of triethylamine to give a 95.8% yield of the triethylamine salt of the sulphated secondary alcohols.

Comparative Experiment No. 3

A commercial $C_{13–17}$ secondary alcohol having an iodine value of 5.0 was sulphated in a batch reactor at a temperature of 35° C. with the amount of sulphur trioxide theoretically required to react with all of the alcohol, in the form of a 5 vol. percent mixture with a dry air stream. After neutralising the reaction product with aqueous caustic soda a 52% yield of alkyl sulphate, calculated on the starting weight of alcohol was obtained. The unreacted organic matter, which was recovered from the neutral product by extraction with petrol, had an iodine value of 30, showing that excessive dehydration of the secondary alcohol had occurred during sulphation. The recovered unreacted organic matter was saponified by heating it with aqueous caustic soda at 80° C. for six hours and then extracted again with petrol, to recover the unsaponifiable matter. The aqueous layer from this second extraction was found to contain sodium alkenyl sulphonate formed by the dehydration and sulphonation of 16.3% of the starting alcohol. Thus, under the reaction conditions employed, 68.3% of the secondary alcohol had reacted to yield a mixture comprising 76% of alkyl sulphates and 24% of alkenyl sulphonates.

EXAMPLE 8

Cetyl oleyl alcohols from sperm oil were sulphated in the apparatus and by the method described in Examples 1 to 6 while an accurately metered stream of monoisopropylamine was introduced to the recycle loop. The following conditions were employed:

time of addition of $SO_3$: 90 minutes
time of addition of isopropylamine: 93 minutes
reaction temperature: 40° C.
$SO_3$ concentration in air stream: 5 vol. percent
molar ratio $SO_3$:alcohol: 1.2:1.0

An analysis of the neutralised product showed that 98.2% of the alcohols had been converted to detergent-active substances and that double bond retention was 80%. The product was converted to its sodium salt by addition of 105% of the stoichiometric proportion of sodium hydroxide and heating the mixture to 100° C. to distil out the amine.

Comparative Experiment No. 4

Cetyl-oleyl alcohols from sperm oil were sulphated at 40° C. with 1.3 gm. moles of $SO_3$ per gm. mole of alcohol and the reaction product was neutralised with a mixture of aqueous NaOH and ethanol. The neutralised product was dried by heating gently on an open tray and then in a 60° C. oven to obtain an anhydrous product. Analysis of the product showed that 92.4% of the alcohols had been converted to detergent-active matter but that the double-bond retention was only 49.6%.

The importance of avoiding attack on the double bond in the sulphation of unsaturated alcohols is illustrated by comparative plate-washing tests performed on the products of Comparative Experiment No. 4 and Example 8. To eliminate the influence of unreacted alcohol upon the performance of the detergent samples they were first purified by extraction with petroleum et her. The tests were made in both soft (10 p.p.m. hardness) and hard (300 p.p.m. hardness) water using 2 gm./litre of 20% active detergents.

| Sample | Percent double-bond retention | Number of plates washed | |
|---|---|---|---|
| | | Soft Water | Hard water |
| Example 8 | 80 | 21 | 10 |
| Experiment 4 | 49.6 | 4 | 3 |

EXAMPLE 9

A batch reaction vessel was charged with 250 gms. of the triethylamine salt of sulphated tallow alcohols containing 90.7% of detergent and 2.1% of unreacted alcohol, and 140 gms. of $C_{14}$–$C_{15}$ secondary alcohols having an average molecular weight of 205. The mixture was agitated vigourously and 65.6 gms. of $SO_3$ (1.2 moles:mole of secondary alcohol) was introduced through the sparge pipe of the vessel in the form of a 5 vol. percent mixture with dry air over a period of fifty minutes. The reaction temperature was regulated in the range of 55° C.–60° C. by circulating cooling water through the jacket of the vessel. Upon completion of the addition of sulphur trioxide the reaction product was neutralised by the addition of 82 gms. of triethylamine to obtain a 95.3% yield of the triethylamine salts of a mixture of tallow alcohol sulphate and secondary alkyl sulphate. This mixture when subsequently converted to its sodium salt by base exchange and incorporated in a heavy-duty detergent powder formulation was found to have good detergency and foaming properties.

EXAMPLE 10

A batch reaction vessel was charged with a mixture of 102.5 gms. of $C_{14}$–$C_{15}$ secondary alcohol and 146 gms. of the triethylamine salt of toluene sulphonic acid. To this mixture was then added during a period of fifty minutes, with vigorous agitation, 48 gms. of sulphur trioxide (1.2 moles per mole of secondary alcohol) in the form of a 5 vol. percent mixture with dry air. The reaction temperature was maintained in the range 60°–65° C. during the initial stages of the $SO_3$ addition but was reduced gradually to 48° C. as the reaction proceeded. When the sulphation was completed the reaction mass was neutralised by the addition of triethylamine. The resultant product contained 51% of the triethylamine salt of secondary alkyl sulphate and 1.42% of unreacted secondary alcohol. Subsequently there was obtained by base exchange a mixture of the sodium salts of sulphated secondary alcohols and toluene sulphonate which exhibited good solubility, foaming and detergency properties when incorporated in liquid detergent formulations.

EXAMPLE 11

A charge of 768 gms. tallow alcohol substrates (3 gm. moles) in a batch reaction vessel was partially sulphated at a temperature of 60° C.–65° C. by the addition of 120 gms. (1.5 gm. moles) of sulphur trioxide in the form of a 5 vol. percent mixture with dry air over a period of 30 minutes, after which the reaction mixture was neutralised by the addition of 152 gms. of triethyl- (1.8 gm. moles) of sulphur trioxide and the reaction mass was then neutralised by the addition of 182 gms. (1.8 gm. moles) of sulphur trioxide and the reaction mass was then neutralised by the addition of 182 gms. of triethylamine. The neutral product contained 90.7% of the triethylamine salt of sulphated tallow alcohols and 2.1% of unreacted alcohol, equivalent to a conversion of 96.2% of the alcohol charged.

EXAMPLE 12

A mixture of 200 gms. of commercial lauryl alcohol and 560 gms. of lauric isopropanolamide was charged to a batch reaction vessel, heated to 50° C. and vigorously agitated. Into this mixture was then introduced through the sparge pipe of the vessel a total of 270 gms. of sulphur trioxide in the form of a 5 vol. percent mixture with dry air, while maintaining the reaction temperature in the range of 55° C.–60° C. by means of cooling. The sulphation reaction was carried out in four separate stages, adding 67.5 gms. of $SO_3$ in each stage. After each stage the reaction mixture was neutralised by the addition of triethylamine to obtain as product the triethylamine salt of sulphated lauryl alcohol and sulphated lauric isopropanolamide. The neutral product from stage 4 contained 92.5% of detergent active matter and 1.72% of free oil.

EXAMPLES 13–16

A batch reaction was charred with sulphonatable raw material and amino compound, the nature and relative proportions of which are shown in Table II. The charge was agitated vigorously and sulphur trioxide, in the form of a 5 vol. percent mixture with dry air introduced through a sparge pipe into the reaction vessel. The period of introduction of $SO_3$ and the amount used relative to the sulphonatable raw material is shown in Table II. The temperature in the reaction vessel was controlled by passing cooling water through a jacket on the reaction vessel.

The results of the examples are shown in Table II.

TABLE II

| Example No.: | Nature of Sulphonatable material | Amino compound employed | Molar ratio of amino compound: sulphonatable material | Period of addition of SO³, mins. | Overall reaction ratio of SO³: sulphonatable material | Reaction temperature, ° C. | Nature of product after neutralisation with triethylamine |
|---|---|---|---|---|---|---|---|
| 13 | $C_{14}$-$C_{15}$ secondary alcohols having M.W. of 204. | Triethylamine alkyl benzene sulphonate having M.W. of 426. | 1.0:1.0 | 45 | 1.3:1.0 | 40-45 | 91.6% detergent active substances 1.3% free oil. |
| 14 | Tallow alcohols having an average M.W. of 256. | ...do... | 1.0:1.0 | 45 | 1.3:1.0 | 40-45 | 89.5% detergent active substances and 1.56% free oil. |
| 15 | Commercial oleyl alcohol having an average M.W. of 262. | ...do... | 1.0:1.0 | 45 | 1.3:1.0 | 40-45 | 92.6% detergent active substances and 2.24% free oil. |
| 16 | Commercial Sperm oil alcohols having an average M.W. of 254. | ...do... | 1.0:1.0 | 45 | 1.3:1.0 | 40-45 | 97% detergent active substances and 1.39% free oil. |

What I claim is:

1. A cyclic process for sulphonating an organic compound selected from the group consisting of alcohols olefins, ketones, fatty acids, and fatty acid alkanolamides, with free sulphur trioxide comprising
   (i) reacting said organic compound with said sulphur trioxide to sulphonate said organic compound;
   (ii) withdrawing a portion of said sulphonated organic compound;
   (iii) reacting said withdrawn sulphonated organic compound with an amino compound selected from the group consisting of aliphatic, aromatic and heterocyclic amines, amine salts, amine complexes and ammonia;
   (iv) recycling the reaction product of said sulphonated organic compound with said amino compound to the reaction (i) of said organic compound with said sulphur trioxide, and
   (v) reacting further of said organic compound with said sulphur trioxide to sulphonate said organic compound in the presence of the recycled reaction product of step (iii).

2. The process of claim 1 wherein the total amount of sulphur trioxide is up to 130% of the stoichiometric proportion required to form the desired sulphonated organic compound.

3. The process of claim 2 wherein said amino compound is selected from the group consisting of alkyl amines having 1 to 3 carbon atoms in each alkyl group, aromatic amines, pyridine, morpholine, amine salts of sulphonic acids, amine complexes with sulphur dioxide, and ammonia, in an amount sufficient to react with from about 40% to 100% of said sulphonated organic compound.

4. The process of claim 3 wherein said organic compound is selected from the group consisting of unsaturated alcohols and secondary alcohols.

5. The process of claim 3 wherein said sulphur trioxide is employed in the form of a gas.

6. A continuous process for sulphonating organic compounds selected from the group consisting of alcohols, olefins, ketones, fatty acids, and fatty acid alkanolamides, with free sulphur trioxide in the presence of a compound which is the product of a further reaction between at least some of the sulphonated product of the reaction between said organic compound and said sulphur trioxide, and an amino compound selected from the group consisting of aliphatic, aromatic and heterocyclic amines, amine salts, amine complexes and ammonia, comprising
   (i) continuously introducing said organic compound into a sulphonation vessel;
   (ii) continuously introducing sulphur trioxide into said sulphonation vessel and reacting said sulphur trioxide with said organic compound to form sulphonated reaction product;
   (iii) continuously withdrawing sulphonated organic reaction product from said sulphonation vessel into a recycle circuit;
   (iv) continuously introducing said amino compound into said recycle circuit whereby said amino compound reacts with the sulphonated product of the reaction between said organic compound and said sulphur trioxide;
   (v) continuously recycling the product of said reaction of said amino compound with the sulphonated product of the reaction between said organic compound and sulphur trioxide from said recycle circuit into said sulphonation vessel; whereby said organic compound introduced into said sulphonation vessel is reacted with sulphur trioxide in the presence of said product containing said amino compound.

7. The process of claim 6 wherein the sulphonated organic compound product of the process is withdrawn from the recycle circuit.

8. The process of claim 7 wherein said organic compound introduced into said sulphonation vessel is introduced in the form of an admixture of organic compound, sulphonated organic compound, and the reaction product of sulphonated organic compound with said amino compound.

9. The process of claim 8 wherein said organic compound is selected from the group consisting of unsaturated alcohols and secondary alcohols and wherein the total amount of sulphur trioxide is up to 130% of the stoichiometric proportion required to form the desired sulphonated organic compound, and wherein said sulphur trioxide is employed in the form of a gas.

10. In the process for sulphonating an organic compound selected from the group consisting of alcohols, olefins, ketones, fatty acids, and fatty acid alkanolamides with free sulphur trioxide to form a desired sulphonated product, the improvement which comprises admixing in the sulphonation reaction vessel, in addition to said organic compound and said sulphur trioxide, another organic compound which is more readily sulphonated than said organic compound, and an amino compound selected from the group consisting of aliphatic, aromatic and heterocyclic amines, amine salts, amine complexes and ammonia.

11. In a process which comprises the reaction of an organic compound selected from the group consisting of alcohols, olefines, ketones, fatty acids and fatty acid alkanolamides with free sulphur trioxide, the improvement which consists in carrying out the reaction in the presence of a compound which is the product of a further reaction between at least some of the product of the reaction between the said organic compound and sulphur trioxide and amino compound selected from the group consisting of amine salts and amine complexes.

12. The process of claim 11 wherein the total amount of sulphur trioxide is up to 130% of the stoichiometric proportion required to form the desired sulphonated organic compound.

13. The process of claim 12 wherein said amino compound is in an amount sufficient to react with from about 40% to 100% of said sulphonated organic compound, and wherein said organic compound is selected from the group consisting of unsaturated alcohols and secondary alcohols.

References Cited

UNITED STATES PATENTS

| | | | |
|---|---|---|---|
| 2,268,443 | 12/1941 | Crowder | 260—686 |
| 2,854,476 | 9/1958 | Chenicek et al. | 260—505 |

ELBERT L. ROBERTS, Primary Examiner